July 22, 1941.   B. N. SAVAGE   2,249,787

VEGETABLE AND FRUIT SKIN REMOVING DEVICE

Filed Sept. 14, 1939   2 Sheets-Sheet 1

INVENTOR.
BAILIE N. SAVAGE
BY
ATTORNEY.

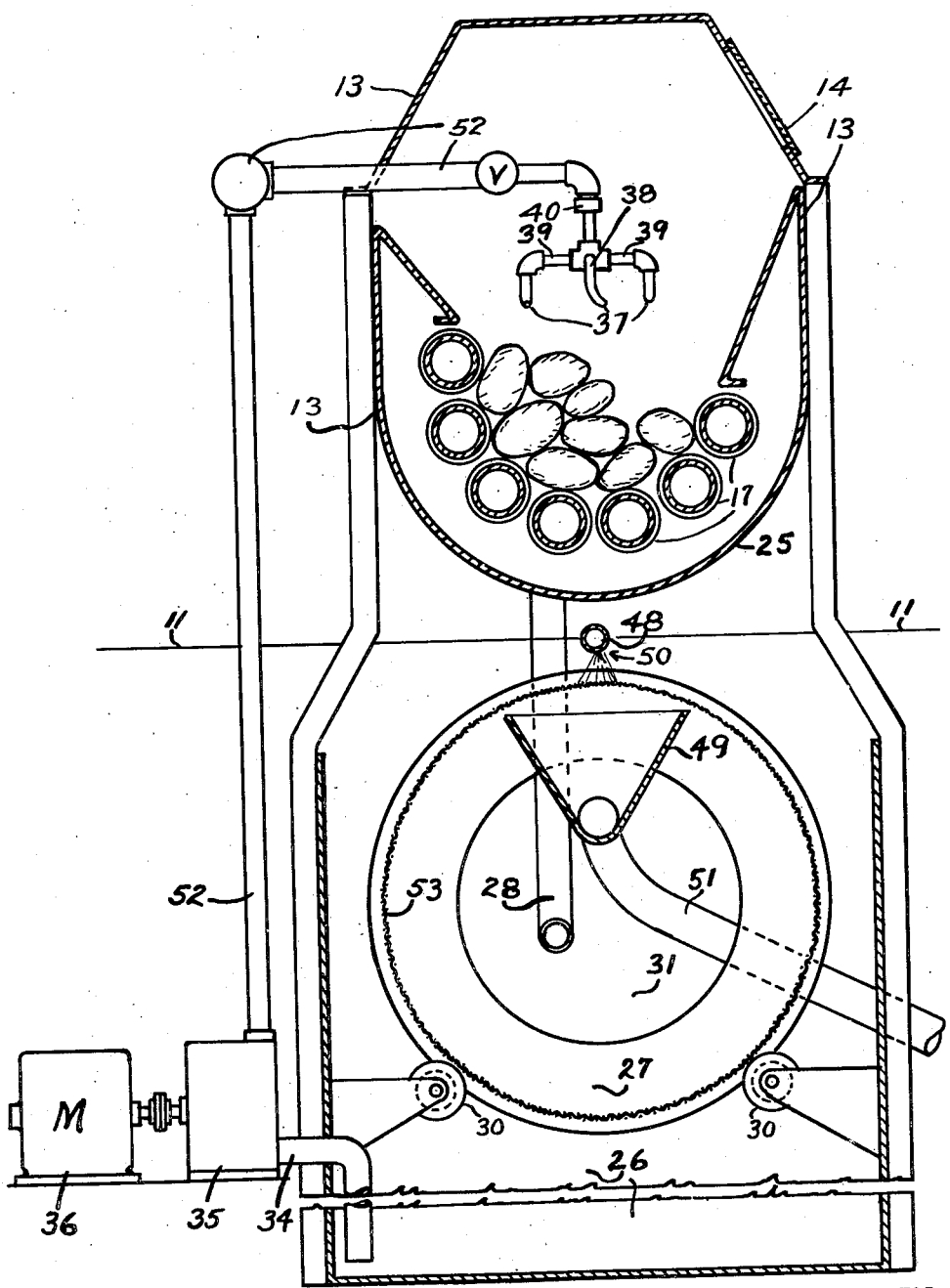

Patented July 22, 1941

2,249,787

UNITED STATES PATENT OFFICE

2,249,787

VEGETABLE AND FRUIT SKIN REMOVING DEVICE

Bailie N. Savage, Seattle, Wash., assignor to Sanitary Food Processing Company, Inc., Seattle, Wash., a corporation of Washington Application September 14, 1939, Serial No. 294,969

4 Claims. (Cl. 146—50)

This invention relates to a skin removing device for treating vegetables and fruit to remove the skins or similar protective coatings. More particularly, this invention relates to such a device to remove the coating of a vegetable or fruit after the same has been loosened, for example, after the article has been subjected to a shock of heat. Particularly is this device adapted to provide means to remove the skins of fruits and vegetables which have been loosened by a process, such as that disclosed in U. S. Letters Patent No. 1,948,884, issued Feb. 27, 1934.

For purposes of definiteness of illustration and clearness of description, the invention will be described in connection with the treatment of Irish potatoes (Solanum tuberosum), but it will be understood that the invention is not limited to said vegetable only, but is equally applicable to other vegetables and fruits, as carrots, turnips, onions, etc.

The primary purpose of this invention is to provide a means for removing the skin of Irish potatoes, particularly after the same have been subjected to a shock of heat.

It is a primary object of the invention to provide rotary spray means so that the spray used in the removal of the charred or blistered skins from the potatoes will successively treat the surfaces of the potatoes and will not impinge for too long a period of time on a particular portion of the potatoes.

It is a further object of the invention to provide a simple, efficient and practical means whereby the potatoes, which have previously been subjected to heat, may be subjected to a spray action to aid in the removal of the charred skins and which spray means will also serve to suddenly cool the potatoes to prevent further cooking thereof.

It is a primary purpose of this invention to provide means so that the potatoes are provided with the desired rubbing action against each other to aid in the removal of the charred skins or corky layer.

It is a further primary object of this invention to provide a device where there is a rubbing action between the driven rolls and the potatoes, which further serves as an aid in removing the charred skins.

The above mentioned general objects of this invention, together with others inherent in the same, are attained by the devices illustrated in the following drawings, the same being preferred exemplary forms of embodiment of this invention, throughout which drawings like reference numerals indicate like parts:

Figure 2 is a sectional view taken substantially on broken line 2—2 of Figure 1;

Figure 1:
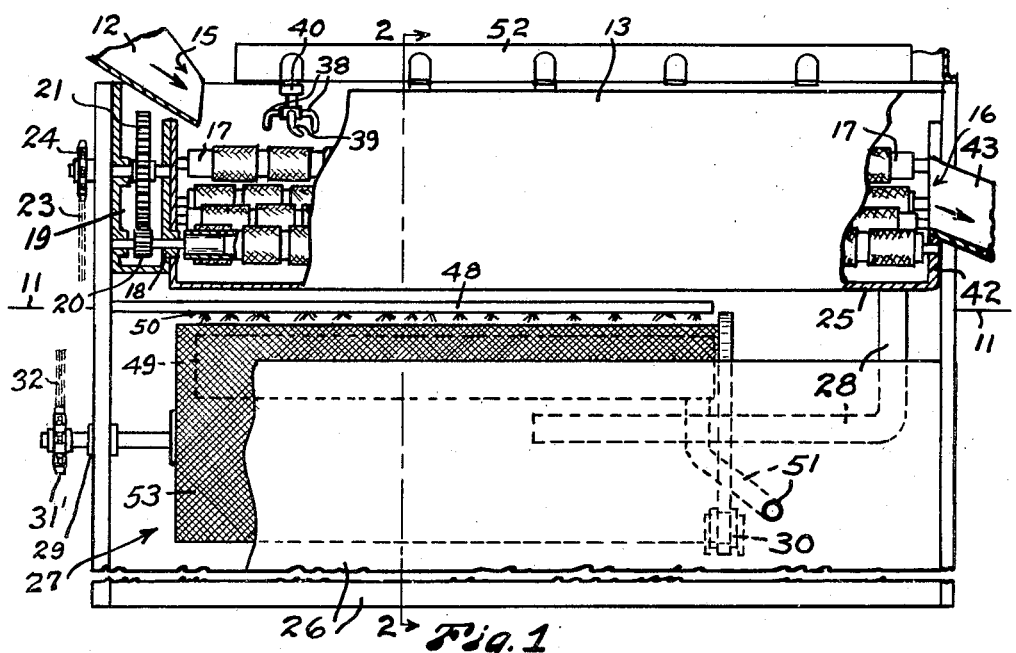
Figure 1 is a side elevation, with parts broken away and parts in section of a device embodying this invention.
Figure 3:
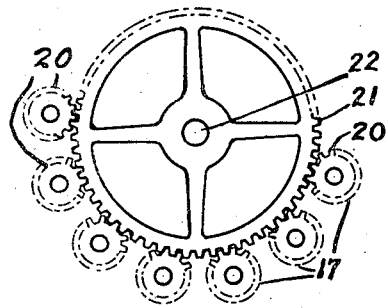
Figure 3 is a detached view, somewhat diagrammatic, illustrating the manner of driving the longitudinal rollers.

The potatoes are first treated by a heating furnace. As the furnace is not part of this invention, the same is not herein illustrated. A reference to one type may be had in my copending application, filed herewith, Serial No. 294,970. Generally, however, the furnace serves to expose the various surface portions of the potato to the impingement of a flame so that the surface of the potato reaches the desired temperature for the desired period of time, as about 1750° F. for about five to ten seconds. This has the effect of blistering and charring the thin outer skin, or corky layer of the potato. The blistered and charred outer skin is adhered to the potatoes. The preferable type of furnace to be used is disclosed in my said co-pending application.

Preferably the heat treated potatoes are delivered from the furnace by way of a chute 12 into the skinning device of this invention.

The skinning device of this invention comprises a housing member 13 which is preferably formed of suitable supports and covered with sheet material. It is also preferably provided with a plurality of glass covered windows or sights 14. The casing or housing 13 may completely enclose the device, except for the supply opening 15 and potato discharge opening 16. The floor level may be conveniently located as at 11. A plurality of longitudinally extending rollers 17 form a trough-like structure. Preferably these rollers are parallel and in section form a semi-circle (see Fig. 2). These rollers 17 are spaced apart so they may rotate independently of each other. Preferably these rollers 17 are driven all in the same direction. This may be accomplished by mounting the rollers 17 for rotary movement in the housing 13 and extending the rollers 17 through an end wall 18. The usual packing material is provided around the shafts of the roller 17 as they extend through the end wall 18 so that oil or other lubricant in the gear box 19 will not leak there past. On the ends of each roller 17 is provided a gear 20. These gears 20 mesh with a main gear 21. The main gear 21 is mounted on a shaft 22 which is connected to a suitable source of power, as by link belt means 23 and gear 24. Gear box 19 may be lubricated in any usual manner, as by oil. The rollers 17 provide the bottom of a trough like means for supporting and turning the potatoes. As the skins are removed they will be discharged with the water downwardly through rollers 17 and onto trough 25. The potato skins and water are discharged from trough 25 to conduit 28.

A separating tank 26 may be positioned at a lower level, as below the skinning device. This separating tank functions to separate the removed skins from the water to permit re-use of the water in the washing-skin removing operation. In view of the high pressure of the water in conduit 52 (hereafter described) small particles of the skins will not create a problem and the water separated from the skins may be reused. One form of separating device comprises a cylindrical member 27 which has a foraminous periphery 53. The cylindrical member 27 is mounted for rotation on bearing 29 and rollers 30 (see Fig. 2). One end of the cylindrical member 27 is provided with an opening 31. The conduit 28 discharging skins and water, passes through this opening 31 and into cylindrical member 27. The cylindrical member 27 is rotated by sprocket 31' and link belt means 32 which are connected to any source of power. In view of the foraminous surface 53 of the periphery of cylindrical member 27, the potato skins will cling to the inside of the cylindrical member 27 and against foraminous surface 53 and the water passes there through and into tank 26.

A conduit 48 is positioned outside of the cylindrical member 27 and in line with trough 49 within the cylindrical member 27. Water under pressure is delivered via nozzles 50 onto and through the foraminous periphery 53 of cylindrical member 27. This loosens and washes the skins into trough 49. The skins and water in trough 49 are delivered via conduit 51 to any suitable discharge. Preferably clear water is delivered through nozzles 50 to eliminate the possibility of plugging the orifices of such nozzles.

The recovered water from a separating tank 26 is delivered by conduit 34 to a pump 35. This pump may be driven by any usual means, as the electric motor 36. The pump 35 serves to deliver water under pressure, such as 120 pounds per square inch to 180 pounds per square inch through conduits 52 to a plurality of spray nozzles 37. Preferably the spray nozzles are mounted on arms 38 and 39—the arms 38 being of a shorter length than the arms 39 to provide concentric sprays of different radii. The arms 38 and 39 are connected to packing bearing members 40 which mount the sprays for rotary movement. Rotary motion to the arms 38 and 39 is provided by the angular direction of the nozzles 37, much in the fashion of the ordinary garden sprinkling device. However, suitable packing bearing members 40 must be provided in view of the operating water pressure.

Figure 4:
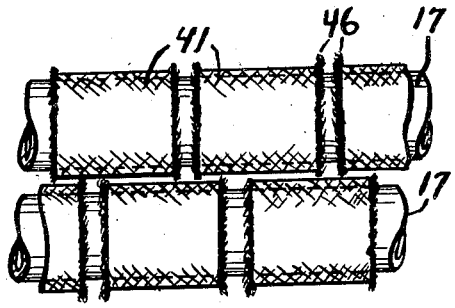
Figure 4 is a detached fragmentary view, with parts broken away and on a larger scale of the longitudinal rollers.

The rollers 17 are preferably somewhat inclined from the supply opening 15 toward the potato discharge opening 16. This facilitates movement of the potatoes towards the discharge end of the device. As the potatoes are delivered onto the rollers 17, these rollers 17 serve to support and turn the potatoes. A surface is provided on the rollers 17 to increase the brushing and turning action of the rollers 17 as respects the potatoes. It has been found that if longitudinally spaced apart fabric members, as of canvas, are secured to the rollers 17, an economical and practical operating device may be obtained. Preferably canvas tubular members 41 are staggered, as shown in Figs. 2 and 4 on the rollers 17. These canvas tubular members 41 are preferably frayed at the respective ends of each tubular member to provide brush like members 46. Brush like members 46 will permit a relatively gentle brushing action of the potatoes and increase the skin removing characteristics of the device. While the invention is not to be limited to the use of canvas tubular members on the rollers 17, as obviously other materials will simulate their action, the same have been found to be very practical in commercial operation.

Preferably all of the rollers 17 are positioned so that in section they form a semi-circle. Also the top roller 17 to the left, as shown in Fig. 2, is higher than the top roller 17 shown to the right in said figure. Preferably the rollers 17 turn in the direction of the arrows shown in Fig. 2 and toward the said higher top roller. This provides for the desired turning and tumbling action of the potatoes as the potatoes will climb up the higher side and then fall by gravity and continue generally in such a cycle. As the potatoes are moving in a circular path, in view of the rollers 17, and toward the discharge opening 16, they are subjected to the action of the sprays of the nozzles 37. As the potatoes travel from the supply opening 15 and toward the potato discharge opening 16, the combined action of the high pressure spray action from nozzles 37, the rough fabric from the canvas tubular members 41, and the rubbing action of one potato against another serves to completely remove the outer skin from the potatoes as they tumble over and over in their travel along the trough. Consequently when the potatoes reach the discharge opening 16, all the skins, with the exception of the deepest eyes or indentations, has been completely removed. In order to delay the travel of the potatoes along the rollers 17, preferably there is provided a dam 42. The height of the dam 42, the length of the trough formed from the rollers 17, the speed of the rollers 17 and the incline of the rollers 17 toward the discharge opening 16 are all to be coordinated to provide the desired time of processing the potatoes for complete removal of the skins, with the exception of possibly the deepest eyes or indentations. After the potatoes leave by way of the discharge opening 16, they may be delivered by a chute 43 to other devices and mechanisms for hand trimming any deep remaining eyes, imperfections in the potatoes, etc. After any hand trimming which may be necessary is completed, the potatoes may be exposed to a bleaching and preserving substance, as gas containing sulphur fumes, as disclosed in United States Letters Patent No. 1,948,877, or they may be exposed to a liquid material containing like agents. The sulphurization treatment, of course, is used only to enhance the keeping qualities of the potatoes as where they are not used promptly.

Figure 5:
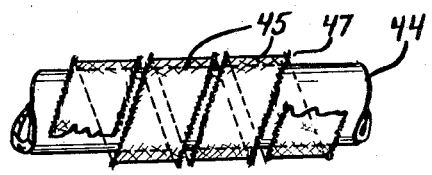
Figure 5 is a view similar to Figure 4, showing an alternative manner of covering one of the longitudinal rollers.

As an alternative construction to urge the potatoes from the intake end of the device toward the discharge end of the device, there is shown rollers 44 in Fig. 5, each of which is provided with a canvas strip 45 which is helically wound thereon. The edges of the canvas strip 45 may be frayed to form a brush like member 47 as shown in said figure. In view of the fact that the rollers 44 and canvas strips 45 thereon may be used to directly supplant the rollers 17 in the other figures, only a detail of one roller 44 is shown in said Fig. 5.

It has been found in actual operation that where potatoes have been peeled by hand that the loss will amount to as much as 20 to 40% by weight. Also much of the mineral and vitamin content of the potato is concentrated in the inner layer of the skin just below the outside corky layer. This mineral and vitamin content of the potato is lost where the potatoes are peeled by hand. On the other hand, where the corky layer or outside thin skin of the potato is first subjected to a flame as disclosed in U. S. Letters Patent No. 1,948,884, substantially all the vitamin and mineral content of the potato is saved. The loss is reduced so that only the corky like thin outer skin is lost. The problem has heretofore remained in providing some practical remedy in removing this outside corky layer after it has been loosened by a flame or heat treatment. It was not only necessary to provide a device which would remove this outer corky skin, but would remove it with such regularity and uniformity, despite changes in the skin condition or changes in the heat treatment, so that the corky outer layer was uniformly removed. This was necessary in order to reduce to a minimum any hand operation necessary to remove extraordinarily deep eye marks and blemishes. The device of this invention has been found to overcome the problems inherent in the prior art and has provided a practical efficiently operating device.

Obviously, changes may be made in the forms, dimensions and arrangement of the parts of this invention, without departing from the principle thereof, the above setting forth only preferred forms of embodiment.

I claim:

1. A device of the character described for skinning articles of vegetable or fruit character, comprising a plurality of parallel driven rolls; spaced apart fabric cover means fixedly secured on each of said rolls, said rolls and said cover means forming a trough like means adapted to support and turn thereon articles to be skinned; brush like means formed from and positioned between spaced apart fabric cover means; and water spray nozzle means directed against said rolls and articles thereon.

2. A device of the character described for removing loosened skins from articles of vegetable or fruit character, comprising a plurality of parallel driven rolls arranged to form a longitudinally inclined trough-like means; article intake means positioned to deliver articles to be skinned into said trough-like means at a location adjacent the higher longitudinal portion of the trough-like means; article discharge means positioned at a location adjacent the lower longitudinal portion of the trough-like means; and a dam positioned transversely of the trough-like means and at a location between the intake means and the discharge means, whereby articles in said trough-like means will be continuously turned by said driven rolls, will move towards said dam, and the period of retention in said trough-like means may be determined by the extent of said dam.

3. A device of the character described for removing loosened skins from articles of vegetable or fruit character, comprising a plurality of parallel driven rolls arranged to form a longitudinally inclined trough like means; a plurality of spaced apart fabric cover means secured on each of said rolls; article intake means positioned to deliver articles to be skinned into said trough like means at a location adjacent the higher longitudinal portion of the trough like means; article discharge means positioned at a location adjacent the lower longitudinal portion of the trough like means; and a dam positioned transversely of the trough like means and at a location between the intake means and the discharge means, whereby articles in said trough like means will be continuously turned by said driven rolls, will move towards said dam, and the period of retention in said trough like means may be determined by the extent of said dam.

4. A device of the character described for removing loosened skins from articles of vegetable or fruit character, comprising a plurality of parallel driven rolls arranged to form a longitudinally inclined trough like means; a spirally wound fabric cover means secured on each of the said rolls; article intake means positioned to deliver articles to be skinned into said trough like means at a location adjacent the higher longitudinal portion of the trough like means; article discharge means positioned at a location adjacent the lower longitudinal portion of the trough like means; and a dam positioned transversely of the trough like means and at a location between the intake means and the discharge means, whereby articles in said trough like means will be continuously turned by said driven rolls, will move towards said dam, and the period of retention in said trough like means may be determined by the extent of said dam.

BAILIE N. SAVAGE.